(12) United States Patent
Kiriki et al.

(10) Patent No.: US 11,753,034 B2
(45) Date of Patent: Sep. 12, 2023

(54) VEHICLE CONTROL DEVICE, MEDIUM FOR STORING COMPUTER PROGRAM FOR VEHICLE CONTROL, AND METHOD FOR CONTROLLING VEHICLE

(71) Applicant: TOYOTA JIDOSHA KABUSHIKI KAISHA, Toyota (JP)

(72) Inventors: Jumpei Kiriki, Tokyo-to (JP); Taiyo Uejima, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 35 days.

(21) Appl. No.: 17/648,749

(22) Filed: Jan. 24, 2022

(65) Prior Publication Data

US 2022/0306158 A1   Sep. 29, 2022

(30) Foreign Application Priority Data

Mar. 24, 2021   (JP) .................. 2021-050569

(51) Int. Cl.
 *B60W 60/00* (2020.01)
 *B60W 30/18* (2012.01)
 *B60W 40/08* (2012.01)

(52) U.S. Cl.
 CPC ...... *B60W 60/0015* (2020.02); *B60W 30/181* (2013.01); *B60W 40/08* (2013.01); *B60W 2540/225* (2020.02); *B60W 2540/229* (2020.02)

(58) Field of Classification Search
 CPC ........... B60W 60/0015; B60W 30/181; B60W 40/08; B60W 2540/225; B60W 2540/229
 See application file for complete search history.

(56) References Cited

U.S. PATENT DOCUMENTS

| | | | |
|---|---|---|---|
| 2013/0311043 A1 | 11/2013 | Kobana et al. | |
| 2018/0037230 A1* | 2/2018 | Otake | B60W 10/06 |
| 2018/0072310 A1* | 3/2018 | Fung | G01C 21/3697 |
| 2018/0099676 A1* | 4/2018 | Goto | B62D 15/0255 |
| 2020/0216074 A1* | 7/2020 | Ishioka | B60Q 5/005 |
| 2020/0262441 A1* | 8/2020 | Kuwahara | B60W 50/12 |

FOREIGN PATENT DOCUMENTS

| | | |
|---|---|---|
| JP | 2009151522 A | 7/2009 |
| JP | 2018020691 A | 2/2018 |
| JP | 2020111092 A | 7/2020 |
| WO | 2012105030 A1 | 8/2012 |

* cited by examiner

*Primary Examiner* — Jelani A Smith
*Assistant Examiner* — Nada Mahyoob Alqaderi
(74) *Attorney, Agent, or Firm* — Dickinson Wright, PLLC

(57) ABSTRACT

A vehicle control device has a processor configured to determine whether or not a problem exists with the level of active operation by the driver and when there is a problem with the driver, to set a stopping location for the vehicle on a traveling lane and to determine whether or not another traffic lane is adjacent on the side of the stopping location opposite from a passing lane and, when another traffic lane is adjacent, to determine whether or not the stopping location is within a stop avoidance area set in the traveling lane, based on an adjacent start location or an adjacent end location and, when the stopping location is within the stop avoidance area, to generate a stopping plan for stopping of the vehicle at a location between the adjacent start location and the adjacent end location other than in the stop avoidance area.

5 Claims, 12 Drawing Sheets

VEHICLE CONTROL DEVICE, MEDIUM FOR STORING COMPUTER PROGRAM FOR VEHICLE CONTROL, AND METHOD FOR CONTROLLING VEHICLE

FIELD

The present disclosure relates to a vehicle control device, to a medium that stores a computer program for vehicle control, and to a method for controlling a vehicle.

BACKGROUND

An automatic control device mounted in a vehicle creates a navigation route for the vehicle based on the current location of the vehicle, the destination location of the vehicle, and map information, and controls the vehicle so that it travels along the navigation route.

The automatic control device controls operation of the vehicle so that a safe distance is maintained between the vehicle and other vehicles. When it has been determined that a safe distance cannot be maintained between the vehicle and another vehicle by automatic control, the automatic control device switches operation of the vehicle from automatic control to manual control, transferring control of the vehicle to the driver.

When there is a problem with the driver, the automatic control device controls the vehicle so that it stops on the traveling lane in which it is traveling. This is to prevent transfer of control of the vehicle to the driver when the automatic control device has determined that safe traveling is not possible.

Japanese Unexamined Patent Publication No. 2020-111092, for example, proposes a system in which, when the vehicle is to be stopped at a predetermined position after it has been determined that operation is not under control of the driver, a merge zone with a high-speed road and a zone including a specified distance from the merge zone are identified as a "stop-prohibited zone" in which stopping of the vehicle is prohibited. The automatic control device can thus stop the vehicle while avoiding zones in which it is likely to be difficult to maintain safe distance between the vehicle and other vehicles by automatic control.

SUMMARY

In a merge zone, the main traffic lane of a high-speed road is adjacent to acceleration lanes that merge with the main traffic lane, allowing vehicles to travel in the acceleration lanes to move into the adjacent main traffic lane. When the distance of the merge zone is long and stopping of the vehicle is prohibited throughout the entire merge zone, it is difficult for the automatic control device to quickly stop the vehicle when a problem with the driver has occurred.

It is therefore an object of the present disclosure to provide a vehicle control device which is able to cause a vehicle to be safely stopped on a traveling lane such as the main traffic lane of a high-speed road that is adjacent to another traffic lane such as an acceleration lane, when a problem with the driver has occurred, so as not to interfere when another vehicle traveling in the other traffic lane moves between the traveling lane and the other traffic lane.

One embodiment of the invention provides a vehicle control device. The vehicle control device has a driver assessment unit that determines whether or not a problem exists with the level of active operation by the driver, a stopping location setting unit that sets a stopping location for stopping of the vehicle on a traveling lane in which the vehicle is traveling based on at least map information, when it has been determined by the driver assessment unit that there is a problem with the driver, a traffic lane assessment unit that determines whether or not another traffic lane is adjacent to the stopping location on the side opposite a passing lane, based on the map information, an avoidance area assessment unit that determines whether or not the stopping location is within a stop avoidance area determined based on an adjacent start location where the other traffic lane begins to be adjacent to the traveling lane or an adjacent end location where the other traffic lane ceases to be adjacent to the traveling lane when it has been determined by the traffic lane assessment unit that another traffic lane is adjacent, and a vehicle stopping plan unit that generates a stopping plan for stopping of the vehicle at a location between the adjacent start location and the adjacent end location other than in the stop avoidance area when it has been determined by the avoidance area assessment unit that the stopping location is within the stop avoidance area.

This vehicle control device preferably further has a shoulder selection unit that selects a location on the shoulder where the vehicle can be stopped adjacent to the traveling lane after the vehicle has passed the adjacent end location when it has been determined by the vehicle stopping plan unit that the vehicle cannot be stopped between the adjacent start location and the adjacent end location, wherein the vehicle stopping plan unit generates a stopping plan for stopping of the vehicle at the location on the shoulder selected by the shoulder selection unit.

The vehicle control device also preferably has a stop avoidance area setting unit that either sets the stop avoidance area as an area of the traveling lane between a first location before the adjacent start location and a second location in the vehicle traveling direction from the adjacent start location, or sets the stop avoidance area as an area of the traveling lane between a third location before the adjacent end location and a fourth location in the vehicle traveling direction from the adjacent end location.

According to another embodiment, a computer-readable, non-transitory medium storing a computer program for vehicle control is provided. The computer program causes a processor to execute a process, the process having determining whether or not a problem exists with the level of active operation by the driver, setting a stopping location for stopping of the vehicle on a traveling lane in which the vehicle is traveling based on at least map information, when it has been determined that there is a problem with the driver, determining whether or not another traffic lane is adjacent to the stopping location on the side opposite a passing lane, based on the map information, determining whether or not the stopping location is within a stop avoidance area set on the traveling lane based on an adjacent start location where the other traffic lane begins to be adjacent to the traveling lane or an adjacent end location where the other traffic lane ceases to be adjacent to the traveling lane when it has been determined that another traffic lane is adjacent, and generating a stopping plan for stopping of the vehicle at a location between the adjacent start location and the adjacent end location other than in the stop avoidance area when it has been determined that the stopping location is within the stop avoidance area.

Another embodiment of the invention provides a method for controlling a vehicle carried out by a vehicle control device. The method for controlling a vehicle has determining whether or not a problem exists with the level of active operation by the driver, setting a stopping location for stopping of the vehicle on a traveling lane in which the vehicle is traveling based on at least map information, when it has been determined that there is a problem with the driver, determining whether or not another traffic lane is adjacent to the stopping location on the side opposite a passing lane, based on the map information, determining whether or not the stopping location is within a stop avoidance area set on the traveling lane based on an adjacent start location where the other traffic lane begins to be adjacent to the traveling lane or an adjacent end location where the other traffic lane ceases to be adjacent to the traveling lane when it has been determined that another traffic lane is adjacent, and generating a stopping plan for stopping of the vehicle at a location between the adjacent start location and the adjacent end location other than in the stop avoidance area when it has been determined that the stopping location is within the stop avoidance area.

When a problem with the driver has occurred, the vehicle control device of the invention can safely stop the vehicle on a traveling lane adjacent to another traffic lane, so as not to interfere with movement of other vehicles between the traveling lane and the other traffic lane.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
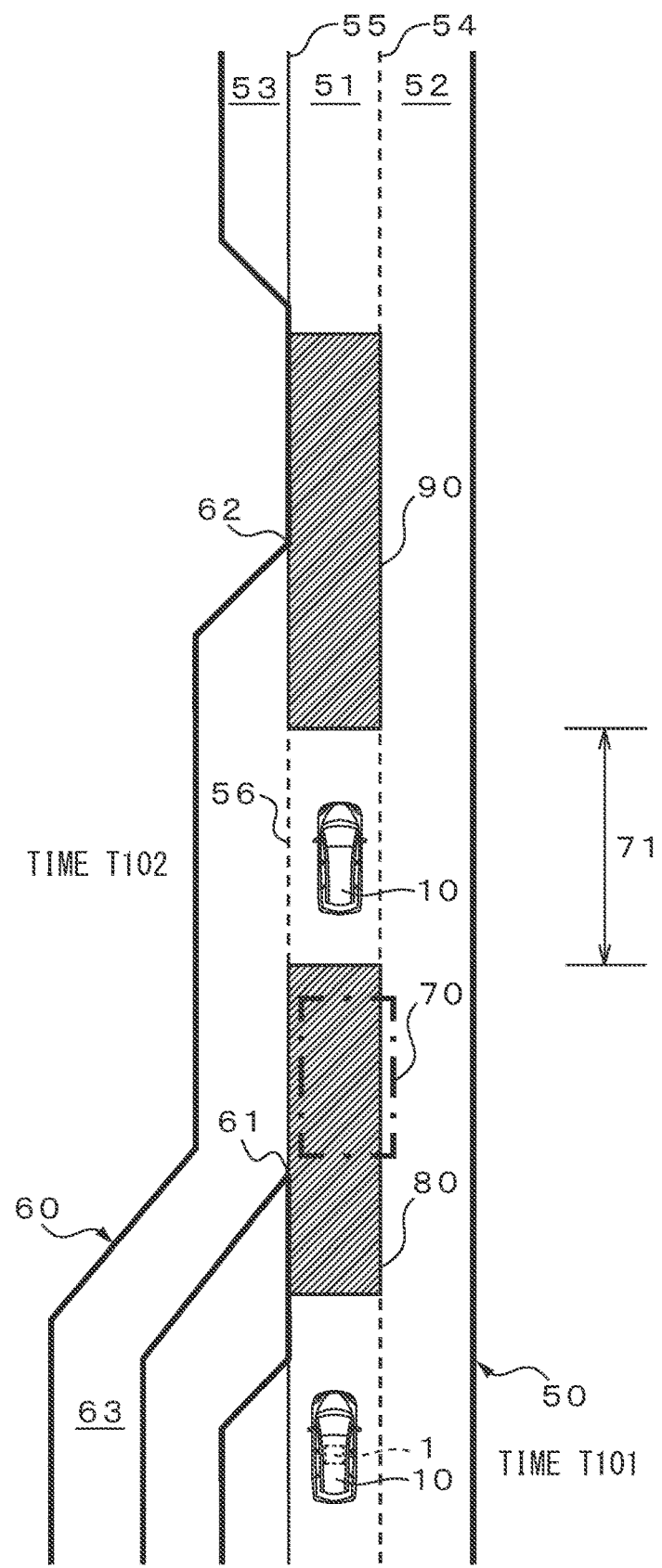
FIG. 1 is a diagram illustrating in overview the operation of a vehicle control system as an example of a vehicle control device of the embodiment.

FIG. 1 is a diagram illustrating in overview the operation of a vehicle control system 1 as an example of a vehicle control device of the embodiment. Operation of the stopping plan system disclosed herein will now be described in overview with reference to FIG. 1.

In the example shown in FIG. 1, a vehicle 10 travels on a traffic lane 51 of a road 50 having two traffic lanes 51, 52 and a shoulder 53. The traffic lane 52 is a passing lane with respect to the traffic lane 51. The traffic lanes 51 and 52 are divided by a lane marking line 54, and the traffic lane 51 and shoulder 53 are divided by a lane marking line 55.

A road 60 with a traffic lane 63 merges with the road 50. The road 60 and road 50 are connected between an adjacent start location 61 where the traffic lane 63 of the road 60 begins to be adjacent to the traffic lane 51 of the road 50, and an adjacent end location 62 where it ceases to be adjacent. The traffic lane 63 of the road 60 and the traffic lane 51 of the road 50 are divided by a lane marking line 56.

The vehicle control system 1 mounted in the vehicle 10 determines any abnormalities in the level of active operation by the driver, sets a stopping location on the traveling lane for stopping the vehicle 10 after a problem with the driver has been determined, sets a stop avoidance area where stopping of the vehicle 10 on the traveling lane is to be avoided, and generates a stopping plan after a problem with the driver has been determined.

At time T101, a problem with the driver is determined by the vehicle control system 1. The vehicle control system 1 sets a stopping location 70 for stopping of the vehicle 10 within the nearest driving zone of the navigation route, on the traffic lane 51 in which the vehicle 10 is traveling.

In the example shown in FIG. 1, the traffic lane 63 of the road 60 is adjacent to the stopping location 70 on the traffic lane 51, on the side opposite from the passing lane 52, and therefore the vehicle control system 1 sets a stop avoidance area 80 based on the adjacent start location 61 where the traffic lane 63 of the road 60 begins to be adjacent to the traffic lane 51 in which the vehicle 10 is traveling, on the traffic lane 51 within the nearest driving zone of the navigation route. The vehicle control system 1 also sets a stop avoidance area 90 based on the adjacent end location 62 where the traffic lane 63 ceases to be adjacent to the traffic lane 51 in which the vehicle 10 is traveling, on the traffic lane 51 within the nearest driving zone of the navigation route.

In the example shown in FIG. 1, the stopping location 70 is within the stop avoidance area 80, and therefore the vehicle control system 1 generates a stopping plan for stopping of the vehicle 10 in an allowable stopping area 71 between the adjacent start location 61 and the adjacent end location 62, which excludes the stop avoidance area 80 and stop avoidance area 90. The vehicle 10 therefore stops in the allowable stopping area 71 of the traffic lane 51 at time T102. When the stopping location 70 is within the stop avoidance area 90 as well, the vehicle control system 1 generates a stopping plan for stopping of the vehicle 10 within the allowable stopping area 71 between the adjacent start location 61 and the adjacent end location 62, which excludes the stop avoidance area 80 and stop avoidance area 90. At time T102, the vehicle 10 stops at a stopping location 72 in the traffic lane 51, based on the stopping plan.

Stopping of the vehicle 10 within the allowable stopping area 71 allows other vehicles, that enter from the road 60 onto the road 50 on which the vehicle 10 is traveling, to move from the traffic lane 63 of the road 60 into the vehicle avoidance area 80 of the traffic lane 51 of the road 50, near the adjacent start location 61. Other vehicles can also move from the traffic lane 63 of the road 60 into the stop avoidance area 90 of the traffic lane 51 of the road 50, near the adjacent end location 62.

As mentioned above, when a problem has occurred in the level of active operation by the driver, the vehicle control system 1 can stop the vehicle 10 on the traffic lane 51 adjacent to the traffic lane 63 of the road 60, so as not to interfere with movement of other vehicles that enter from the road 60 merging with the road 50, onto the road 50 on which the vehicle 10 is traveling, between the traffic lane 63 of the road 60 and the traffic lane 51 in which the vehicle 10 is traveling.

Figure 2:
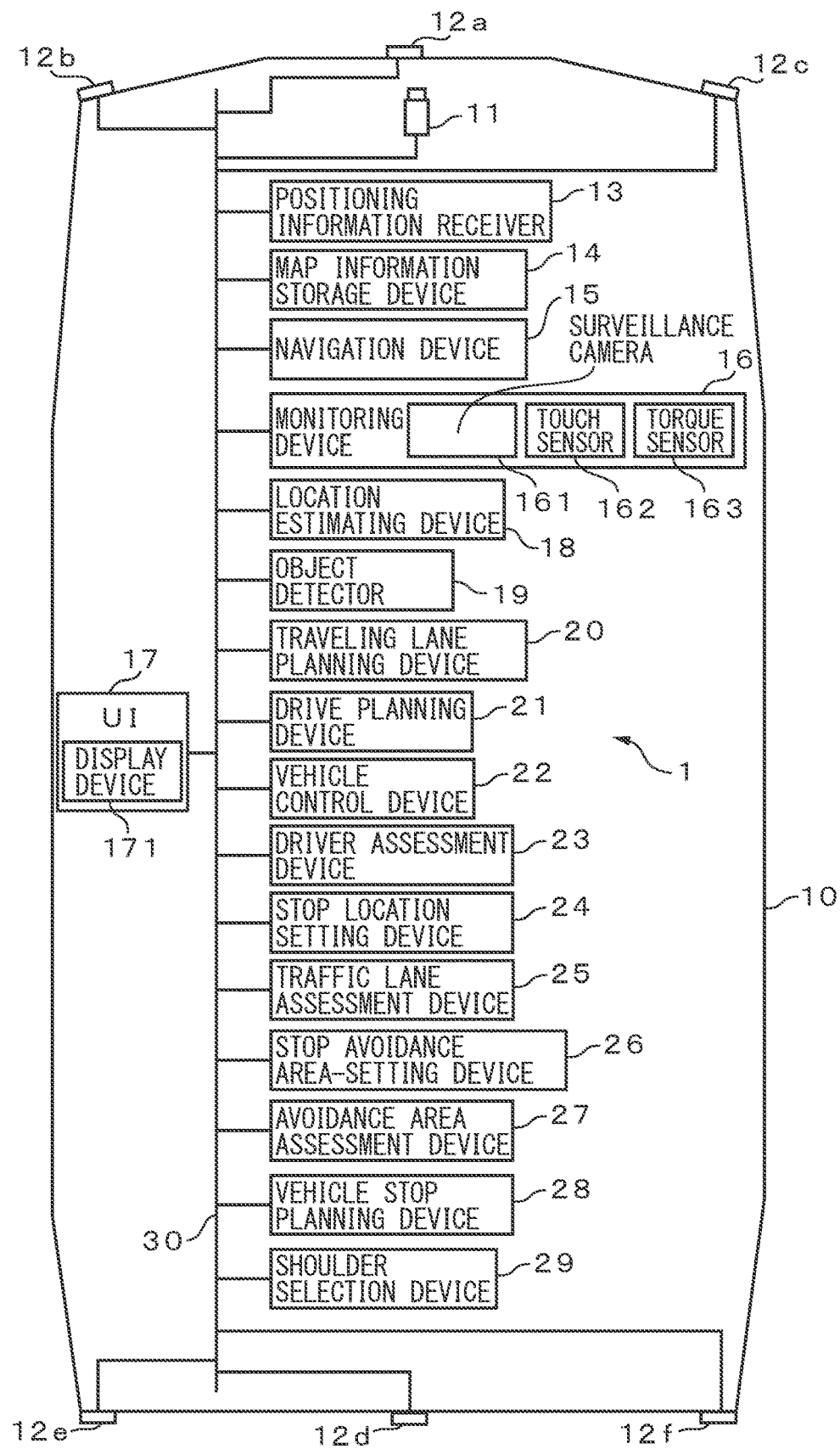
FIG. 2 is a general schematic drawing of a vehicle in which a vehicle control system of the embodiment is mounted.

FIG. 2 is a general schematic drawing of a vehicle 10 in which the vehicle control system 1 is mounted. The vehicle control system 1 comprises a camera 11, radar sensors 12a to 12e, a positioning information receiver 13, a map information storage device 14, a navigation device 15, a monitoring device 16, a user interface (UI) 17, a location estimating device 18, an object detector 19, a traveling lane planning device 20, a drive planning device 21, a vehicle control device 22, a driver assessment device 23, a stop location setting device 24, a traffic lane assessment device 25, a stop avoidance area-setting device 26, an avoidance area assessment device 27, a vehicle stop planning device 28 and a shoulder selection device 29. When a problem with the driver has occurred, the driver assessment device 23, stop location setting device 24, traffic lane assessment device 25, stop avoidance area-setting device 26, avoidance area assessment device 27, vehicle stop planning device 28 and shoulder selection device 29 together generate a stopping plan for stopping of the vehicle 10 on the traveling lane. The vehicle 10 may also have a LiDAR sensor to detect road features or other objects.

The camera 11, radar sensors 12a to 12d, positioning information receiver 13, map information storage device 14, navigation device 15, monitoring device 16, user interface (UI) 17, location estimating device 18, object detector 19, traveling lane planning device 20, drive planning device 21, vehicle control device 22, driver assessment device 23, stop location setting device 24, traffic lane assessment device 25, stop avoidance area-setting device 26, avoidance area assessment device 27, vehicle stop planning device 28 and shoulder selection device 29 are connected in a communicable manner through an in-vehicle network 30 that conforms to controller area network standards.

The camera 11 is an example of an imaging unit provided in the vehicle 10. The camera 11 is mounted inside the vehicle 10 and directed toward the front of the vehicle 10. The camera 11, for example, takes a camera image in which the environment of a predetermined region ahead of the vehicle 10 is shown, at a predetermined cycle. The camera image can show the road in the predetermined region ahead of the vehicle 10, and road features such as surface lane marking lines on the road. The camera 11 has a 2D detector composed of an array of photoelectric conversion elements with visible light sensitivity, such as a CCD or C-MOS, and an imaging optical system that forms an image of the photographed region on the 2D detector.

Each time a camera image is taken, the camera 11 outputs the camera image and the camera image photograph time at which the camera image was taken, through the in-vehicle network 30 to the location estimating device 18 and object detector 19. The camera image is also used for processing at the location estimating device 18 to estimate the location of the vehicle 10. At the object detector 19, the camera image is used for processing to detect other objects surrounding the vehicle 10.

The radar sensors 12a to 12f are mounted on the outer sides of the vehicle 10, for example, being directed toward the front, left front side, right front side, rear, left rear side and right rear side of the vehicle 10, respectively. The radar sensors 12a to 12f respectively synchronize and emit millimeter waves toward the front, left front, right front, rear, left rear and right rear of the vehicle 10, at a reflected wave information acquisition time set with a predetermined cycle, and receive a reflected wave that has been reflected from a reflector. The time required for the reflected wave to return contains information for the distance between the vehicle 10 and other objects located in the direction in which the millimeter waves have been emitted. Each of the radar sensors 12a to 12f outputs the reflected wave information that includes the millimeter wave emission direction and the time required for the reflected wave to return, together with the reflected wave information acquisition time at which the millimeter waves were emitted, through the in-vehicle network 30 to the object detector 19. At the object detector 19, the reflected wave information is used for processing to detect other objects surrounding the vehicle 10.

The positioning information receiver 13 outputs positioning information that represents the current location of the vehicle 10. The positioning information receiver 13 may be a GNSS receiver, for example. The positioning information receiver 13 outputs positioning information and the positioning information acquisition time at which the positioning information has been acquired, to the map information storage device 14 and navigation device 15, each time positioning information is acquired at a predetermined receiving cycle.

The map information storage device 14 stores wide-area map information for a relatively wide area (an area of 10 to 30 km$^2$, for example) that includes the current location of the vehicle 10. The wide-area map information preferably has high precision map information including three-dimensional information for the road surface, information for the types and locations of structures and road features such as road lane marking lines, and the legal speed limit for the road. The map information storage device 14 receives the wide-area map information from an external server via a base station, by wireless communication through a wireless communication device (not shown) mounted in the vehicle 10, in relation to the current location of the vehicle 10, and stores it in the storage device. Each time positioning information is input from the positioning information receiver 13, the map information storage device 14 refers to the stored wide-area map information and outputs map information for a relatively narrow area including the current location represented by the positioning information (for example, an area of 100 m$^2$ to 10 km$^2$), through the in-vehicle network 30 to the location estimating device 18, the traveling lane planning device 20 and the drive planning device 21, stop location setting device 24, traffic lane assessment device 25, stop avoidance area-setting device 26, avoidance area assessment device 27, vehicle stop planning device 28 and shoulder selection device 29, etc.

Based on the navigation map information, the destination location of the vehicle 10 input through the UI 17, and positioning information representing the current location of the vehicle 10 input from the positioning information receiver 13, the navigation device 15 creates a navigation route from the current location to the destination location of the vehicle 10. The navigation route includes information relating to the locations of right turns, left turns, merging and branching. When the destination location has been newly set or the current location of the vehicle 10 has exited the navigation route, the navigation device 15 creates a new navigation route for the vehicle 10. Every time a navigation route is created, the navigation device 15 outputs the navigation route to the location estimating device 18, the traveling lane planning device 20 and the drive planning device 21, via the in-vehicle network 30.

The monitoring device 16 monitors the state of the driver, and when activity of the driver related to driving has not been detected, it generates a "non-active driving signal", indicating that activity of the driver relating to driving has not been detected. The monitoring device 16 outputs the non-active driving signal to the driver assessment device 23 via the in-vehicle network 31. The monitoring device 16 comprises a surveillance camera 161 that photographs a head image that includes the head of the driver, a touch sensor 162 that detects when the driver is holding the steering wheel, and a torque sensor 163 that detects the torque of the steering wheel. Based on an image of the head photographed at a monitoring time with a predetermined cycle, the monitoring device 16 detects the driver's line-of-sight direction, the degree to which the eyes are open (hereunder also referred to as "degree of eye opening") and the degree to which the mouth is open (hereunder also referred to as "degree of mouth opening"), and determines the level to which the driver is active in operating the vehicle, based on the detected line-of-sight direction, degree of eye opening and degree of mouth opening. When the line-of-sight direction is out of a predetermined range that includes the front of the vehicle 10, the monitoring device 16 determines that the level of active operation by the driver is low. When the degree of eye opening is less than a predetermined reference value for the degree of eye opening or the degree of mouth opening is greater than a predetermined reference value for the degree of mouth opening, the monitoring device 16 likewise determines that the level of active operation by the driver is low. When it has been determined that the level of active operation by the driver is low, it is possible that the driver is in an abnormal condition or that the driver has an abnormal level of concentration on driving. On the other hand, when the line-of-sight direction is within a predetermined range including the front of the vehicle 10, or the degree of eye opening is greater than a predetermined reference value for the degree of eye opening, or the degree of mouth opening is less than a predetermined reference value for the degree of mouth opening, the monitoring device 16 determines that the level of active operation by the driver is high.

When it has been determined that the level of active operation by the driver is low, the monitoring device 16 alerts the driver through the UI 17 to recommend active operation the vehicle. If, within a predetermined time after having alerted the driver, it has been determined that the level of active operation by the driver is high based on the detected line-of-sight direction, degree of eye opening and degree of mouth opening, the monitoring device 16 determines that the driver is actively operating the vehicle. If, within a predetermined time after having alerted the driver, the touch sensor 162 has detected that the driver is holding the steering wheel, or the torque sensor 163 has detected operation of the steering wheel by the driver, the monitoring device 16 determines that the driver is actively operating the vehicle. If, within a predetermined time after having alerted the driver, operation of the accelerator pedal or brake pedal by the driver has been detected, the monitoring device 16 determines that the driver is actively operating the vehicle. On the other hand, when it has not been determined that the level of active operation by the driver is high, and the touch sensor 162 has not detected that the driver is holding the steering wheel, and the torque sensor 163 has not detected operation of the steering wheel by the driver, and operation of the accelerator pedal or brake pedal by the driver has not been detected, within a predetermined time after having alerted the driver, then it is determined that the driver is not actively operating the vehicle. The monitoring device 16 also generates a non-active driving signal indicating that activity related to operation by the driver has not been detected. The monitoring device 16 outputs the non-active driving signal to the driver assessment device 23. This is only one example of generating a non-active driving signal, and the monitoring device 16 may use another method to determine whether or not a non-active driving signal is to be generated. Moreover, in the example described above, a single alert is sent to the driver before generating the non-active driving signal, but the monitoring device 16 may send multiple alerts or may generate the non-active driving signal without sending an alert.

The UI 17 is an example of a notifying unit. The UI 17 is controlled by the navigation device 15, monitoring device 16 and drive planning device 21 to give the driver traveling information for the vehicle 10 and alerts for recommending active operation. The UI 17 also creates an operation signal in response to operation of the vehicle 10 by the driver. The traveling information of the vehicle 10 includes information relating to the current location of the vehicle and the current and future route of the vehicle, such as the navigation route. The UI 17 has a display device 171 such as a liquid crystal display or touch panel, for display of the traveling information and warnings. The UI 17 may also have an acoustic output device (not shown) to notify the driver of traveling information and alerts. The UI 17 also has a touch panel or operating button, for example, as an input device for inputting operation information from the driver to the vehicle 10. The operation information may be, for example, a destination location, transit points, vehicle speed or other vehicle control information. The UI 17 outputs the input operation information to the navigation device 15 and the drive planning device 21, via the in-vehicle network 30.

The location estimating device 18 estimates the location of the vehicle 10 at the camera image photograph time, based on the road features surrounding the vehicle 10 represented in the camera image. For example, the location estimating device 18 compares lane marking lines identified in the camera image with lane marking lines represented in the map information input from the map information storage device 14, and determines the estimated location and estimated declination of the vehicle 10 at the camera image photograph time. The location estimating device 18 estimates the road traveling lane where the vehicle 10 is located, based on the lane marking lines represented in the map information and on the estimated location and estimated declination of the vehicle 10. Each time the estimated location, estimated declination and traveling lane of the vehicle 10 are determined at the camera image photograph time, the location estimating device 18 outputs this information to the object detector 19, traveling lane planning device 20, drive planning device 21 and vehicle control device 22, stop location setting device 24, traffic lane assessment device 25, stop avoidance area-setting device 26, avoidance area assessment device 27, vehicle stop planning device 28 and shoulder selection device 29, etc.

The object detector 19 detects other objects around the vehicle 10 and their types (for example, vehicles) based on the camera image and reflected wave information. Other objects also include other vehicles traveling around the vehicle 10. The object detector 19 tracks other detected objects and determines the trajectories of the other objects. In addition, the object detector 19 identifies the traveling lanes in which the other objects are traveling, based on the lane marking lines represented in the map information and the locations of the objects. The object detector 19 outputs object detection information which includes information representing the types of other objects that were detected, information indicating their locations, and also information indicating their traveling lanes, to the traveling lane planning device 20 and drive planning device 21, stop location setting device 24, traffic lane assessment device 25, stop avoidance area-setting device 26, avoidance area assessment device 27, vehicle stop planning device 28 and shoulder selection device 29, etc.

At a traveling lane-planning creation time set in a predetermined cycle, the traveling lane planning device 20 selects a traffic lane on the road on which the vehicle 10 is traveling, within the nearest driving zone (for example, 10 km) selected from the navigation route, based on the map information, the navigation route and surrounding environment information and the current location of the vehicle 10, and creates a traveling lane plan representing the scheduled traveling lane for traveling of the vehicle 10. For example, the traveling lane planning device 20 creates a traveling lane plan for the vehicle 10 to travel on a traffic lane other than a passing traffic lane. Each time a traveling lane plan is created, the traveling lane planning device 20 outputs the traveling lane plan to the drive planning device 21, stop location setting device 24, traffic lane assessment device 25, stop avoidance area-setting device 26, avoidance area assessment device 27, vehicle stop planning device 28 and shoulder selection device 29, etc.

The traveling lane planning device 20 also determines whether or not a lane change is necessary within the nearest driving zone selected from the navigation route, based on the map information, the navigation route and the current location of the vehicle 10. The traveling lane planning device 20 may further utilize surrounding environment information or vehicle status information to determine whether or not a lane change is necessary. The surrounding environment information includes the locations and speeds of other vehicles traveling around the vehicle 10. The vehicle status information includes the current location of the vehicle 10, and the vehicle speed, acceleration and traveling direction. Specifically, the traveling lane planning device 20 determines whether or not a lane change is necessary for moving to a traffic lane toward the destination location of the vehicle 10, based on the navigation route and the current location of the vehicle 10. It is determined whether or not the vehicle 10 is approaching another road that merges ahead from the traveling route on which it is currently traveling (merge), or the vehicle 10 is exiting onto another road branching out ahead from the traveling route (branch). Since merging and branching involve movement of the vehicle from a lane of the traveling route to a lane in another road, a lane change is carried out.

At a driving plan creation time set with a predetermined cycle, the drive planning device 21 carries out driving plan processing in which it creates a driving plan representing the scheduled traveling trajectory of the vehicle 10 up until a predetermined time (for example, 5 seconds), based on the traveling lane plan, the map information, the current location of the vehicle 10, the surrounding environment information and the vehicle status information. The driving plan is represented as a combination of the target location of the vehicle 10 and the target vehicle speed at the target location, at each time from the current time until the predetermined time. The cycle in which the driving plan is created is preferably shorter than the cycle in which the traveling lane plan is created. When the traveling lane plan includes a lane change wherein the vehicle 10 is to move between traffic lanes, the drive planning device 21 creates a driving plan that includes the lane change, in such a manner that a predetermined distance can be maintained between the vehicle 10 and other vehicles. When the traveling lane plan includes a lane change wherein the vehicle 10 is to move between traffic lanes, but a predetermined distance cannot be ensured between the vehicle 10 and another vehicle, the drive planning device 21 creates a driving plan for stopping the vehicle. The drive planning device 21 outputs a driving plan to the vehicle control device 22 for each driving plan created.

The vehicle control device 22 controls each unit of the vehicle 10 based on the current location of the vehicle 10 and the vehicle speed and yaw rate, as well as on the driving plan generated by the drive planning device 21, so that the vehicle 10 travels along the navigation route. For example, the vehicle control device 22 determines the steering angle, acceleration and angular acceleration of the vehicle 10 according to the driving plan and the speed and yaw rate of the vehicle 10, and sets the amount of steering, and the accelerator or brake level so as to match that steering angle, accelerator level and angular acceleration. The vehicle control device 22 also outputs a control signal corresponding to a set steering amount, to an actuator (not shown) that controls the steering wheel for the vehicle 10. The vehicle control device 22 also determines the amount of fuel injection according to a set accelerator level, and outputs a control signal corresponding to the amount of fuel injection to a drive unit (not shown) of the engine of the vehicle 10. Alternatively, the vehicle control device 22 may output a control signal corresponding to a set brake level to the brake (not shown) of the vehicle 10.

The driver assessment device 23 determines whether or not a problem exists with the level of active operation by the driver. When it has been determined that there is a problem with the driver, the stop location setting device 24 sets the stopping location for stopping of the vehicle 10 on the traveling lane in which the vehicle 10 is traveling, based on at least map information. The traffic lane assessment device 25 determines whether or not another traffic lane is adjacent on the side of the stopping location opposite from a passing lane, based on map information. When it has been determined that another traffic lane is adjacent on the side of the stopping location opposite from a passing lane, the stop avoidance area-setting device 26 sets the stop avoidance area based on the adjacent start location where the other traffic lane begins to be adjacent to the traveling lane and the adjacent end location where the other traffic lane ceases to be adjacent to the traveling lane. The avoidance area assessment device 27 determines whether or not the stopping location is within the stop avoidance area. When it has been determined that the stopping location is within the stop avoidance area, the vehicle stop planning device 28 generates a stopping plan for stopping of the vehicle at a location between the adjacent start location and the adjacent end location other than in the stop avoidance area. When the vehicle 10 cannot be stopped between the adjacent start location and the adjacent end location, the shoulder selection device 29 selects a location on the shoulder where the vehicle 10 can be stopped adjacent to the traveling lane, after the vehicle 10 has passed through the stopping zone.

The location estimating device 18, object detector 19, traveling lane planning device 20, drive planning device 21, vehicle control device 22, driver assessment device 23, stop location setting device 24, traffic lane assessment device 25, stop avoidance area-setting device 26, avoidance area assessment device 27, vehicle stop planning device 28 and shoulder selection device 29 comprise a communication interface (not shown), a memory (not shown) and a processor (not shown). The communication interface has an interface circuit to connect each device with the in-vehicle network 30.

All or some of the functions of the location estimating device 18, object detector 19, traveling lane planning device 20, drive planning device 21, vehicle control device 22, driver assessment device 23, stop location setting device 24, traffic lane assessment device 25, stop avoidance area-setting device 26, avoidance area assessment device 27, vehicle stop planning device 28 and shoulder selection device 29 are, for example, functional modules realized by a computer program that is operated in a processor. Alternatively, the functional module of the processor may be a specialized computing circuit in the processor. The memory is an example of a memory unit, and it has a volatile semiconductor memory and a non-volatile semiconductor memory, for example. The memory stores an application computer program and various data to be used for information processing carried out by the processor of each device. The processor comprises one or more CPUs (Central Processing Units) and their peripheral circuits. The processor may also have other computing circuits such as a logical operation unit, numerical calculation unit or graphic processing unit.

The location estimating device 18, object detector 19, traveling lane planning device 20, drive planning device 21, vehicle control device 22, driver assessment device 23, stop location setting device 24, traffic lane assessment device 25, stop avoidance area-setting device 26, avoidance area assessment device 27, vehicle stop planning device 28 and shoulder selection device 29 were explained above as separate devices, but all or some of them may be constructed in a single device.

The driver assessment device 23, stop location setting device 24, traffic lane assessment device 25, stop avoidance area-setting device 26, avoidance area assessment device 27, vehicle stop planning device 28 and shoulder selection device 29 carry out stopping plan processing in cooperation with each other.

Figure 3:
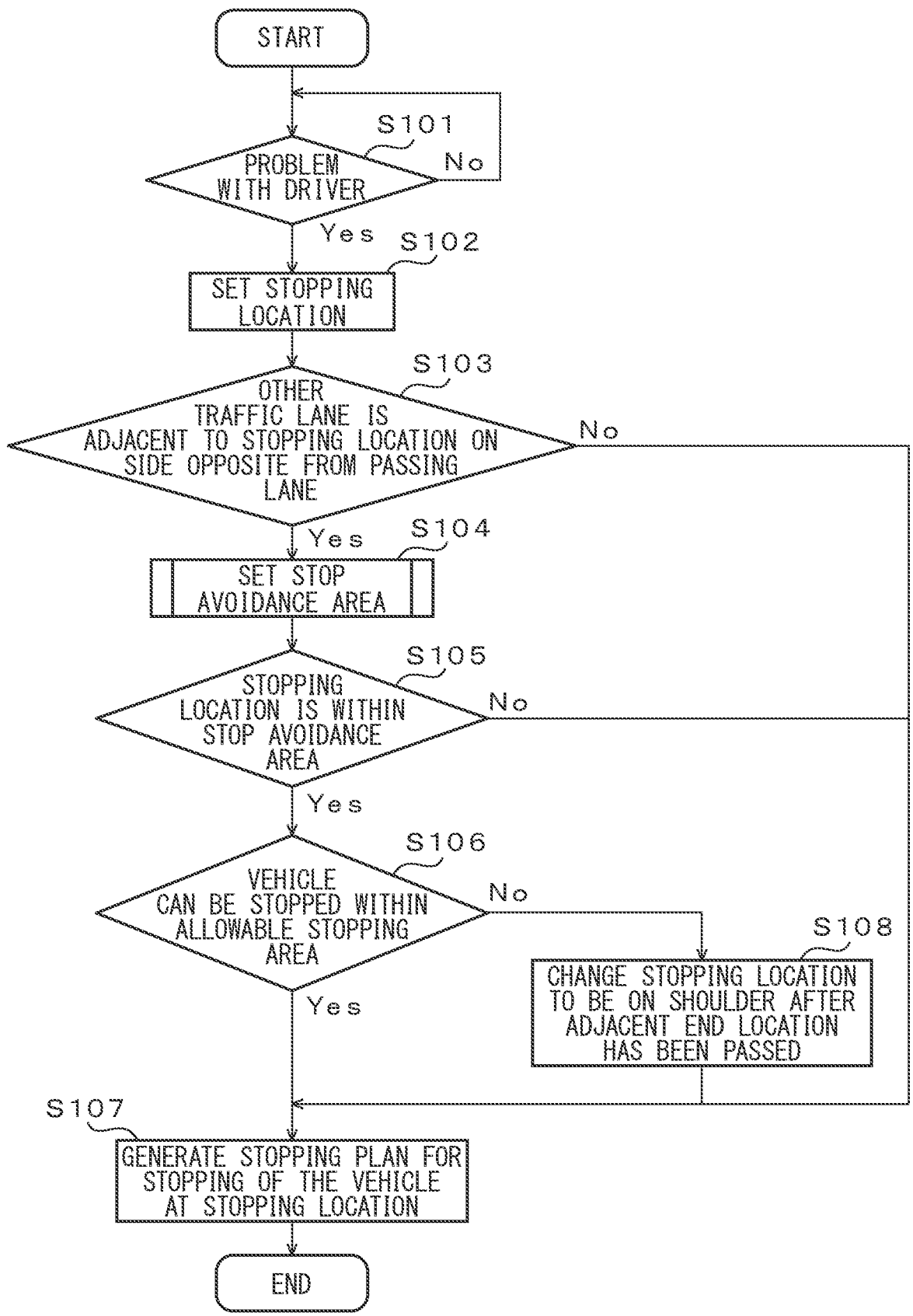
FIG. 3 is an operation flow chart for a vehicle control system of the embodiment.

FIG. 3 is an example of an operation flow chart for the vehicle control system 1. Processing by the vehicle control system 1 will be described below with reference to FIG. 3. The vehicle control system 1 repeatedly carries out stopping plan processing according to the operation flow chart shown in FIG. 3, while the vehicle 10 is traveling.

First, the driver assessment device 23 of the vehicle control system 1 determines whether or not a problem exists with the level of active operation by the driver, at a driver assessment time that is set with a predetermined cycle (step S101). When a non-active driving signal has been input from the monitoring device 16, indicating that active operation of the vehicle by the driver has not been detected, the driver assessment unit 41 determines that there is a problem with the driver (step S101—Yes). When a non-active driving signal has not been input from the monitoring device 16 (step S101—No), the driver assessment device 23 determines that there is no problem with the driver, and processing returns to step S101. In the example shown in FIG. 6, the driver assessment unit 41 determines that there is a problem with the driver, at time T101.

When it has been determined that there is a problem with the driver, the stop location setting device 24 of the vehicle control system 1 sets a stopping location for stopping of the vehicle 10 on the traffic lane in which the vehicle 10 is traveling, within the nearest driving zone, based on the current location of the vehicle 10, the speed of the vehicle 10 and map information (step S102).

Figure 6:
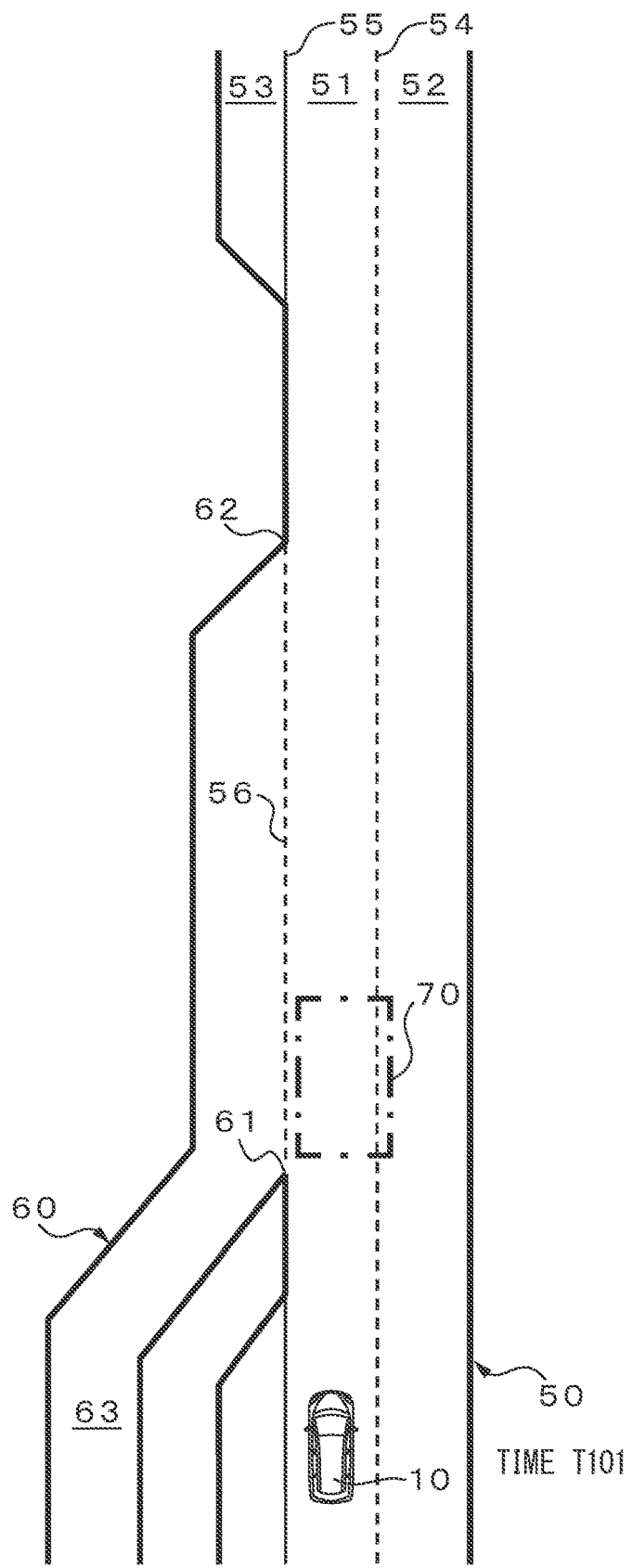
FIG. 6 is a diagram illustrating operation of a vehicle control system (1).

In the example shown in FIG. 6, the stop location setting device 24 uses the speed of the vehicle 10, and a target deceleration set according to the speed, to set the stopping location 70 where the speed of the vehicle 10 is to be zero and stop on the traffic lane 51. A memory (not shown) of the stop location setting device 24 stores the relationship between the speed of the vehicle 10 and the target deceleration. The size of the target deceleration is preferably set to be a size such that the behavior of the vehicle 10 does not cause anxiety for the driver during the time until the vehicle 10 stops from the speed associated with the target deceleration. The target deceleration is preferably also set to be a size allowing the vehicle 10 to stop within the driving zone. A stopping zone setting unit 42 uses a target deceleration associated with the speed of the vehicle 10, which is read out from a memory 32, and the speed of the vehicle 10, to set the stopping location 70 where the speed will be zero, on the traffic lane 51 in which the vehicle 10 is traveling. The stopping location 70 is preferably a region including the dimensions of the vehicle 10.

Next, the traffic lane assessment device 25 of the vehicle control system 1 determines whether or not another traffic lane is adjacent on the side of the stopping location 70 opposite from the passing lane 52, based on map information (step S103). In the example shown in FIG. 6, since the traffic lane 63 of the road 60 merging with the road 50 on which the vehicle 10 is traveling is adjacent to the stopping location 70 on the side opposite from the passing lane 52, the traffic lane assessment device 25 determines that another traffic lane is adjacent to the stopping location 70 on the side opposite from the passing lane 52 (step S103—Yes). When there is no passing lane adjacent to the traffic lane in which the vehicle 10 is traveling, the traffic lane assessment device 25 determines whether or not another traffic lane is adjacent on the side opposite from the side where a passing lane would be. The side opposite from the side where a passing lane would be is the left side of the traveling lane when the vehicle is traveling in left-side traffic and on the right side of the traveling lane when the vehicle is traveling in right-side traffic.

Figure 7:
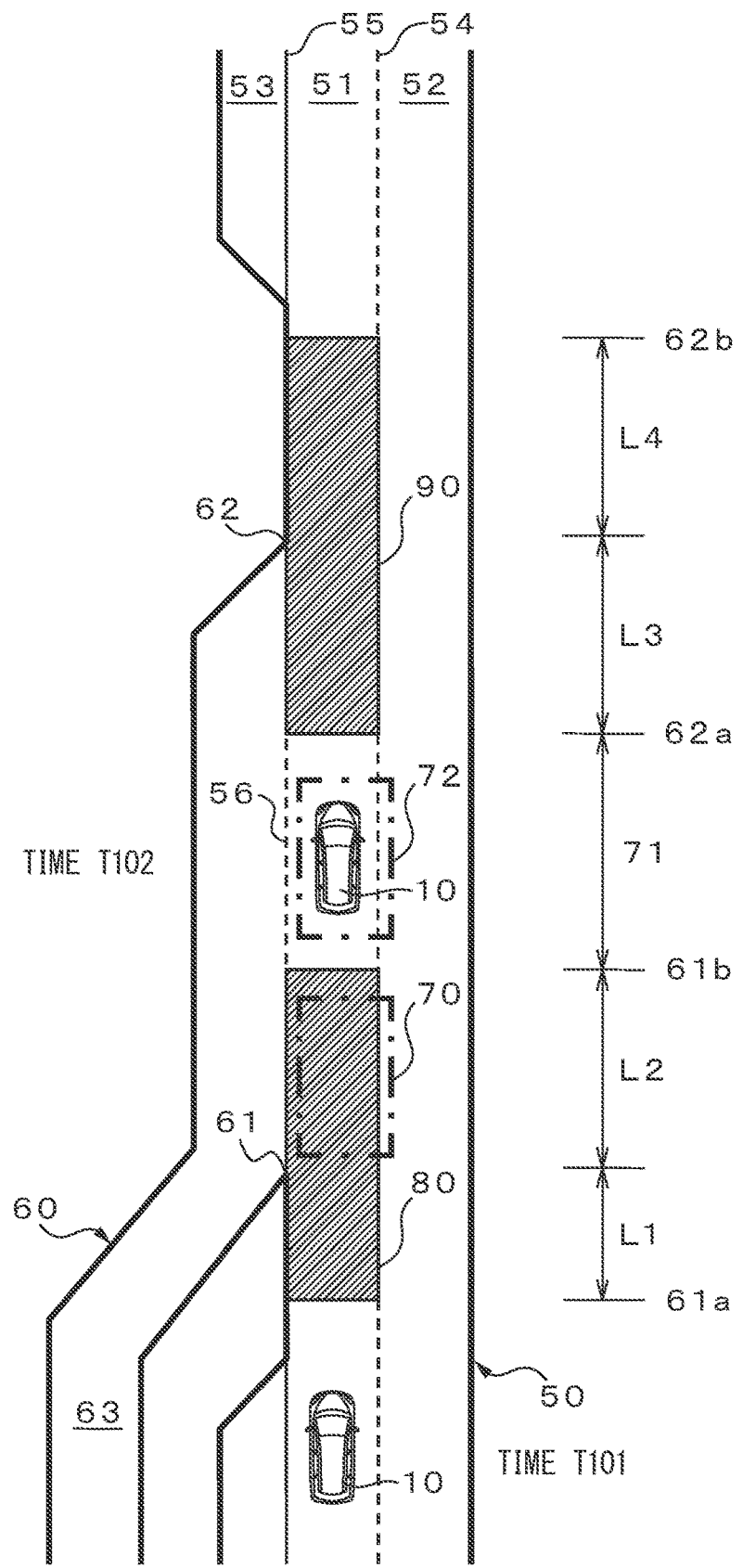
FIG. 7 is a diagram illustrating operation of a vehicle control system (2).

Next, as shown in FIG. 7, the stop avoidance area-setting device 26 of the vehicle control system 1 sets a stop avoidance area 80 based on the adjacent start location 61 where the traffic lane 63 of the road 60 begins to be adjacent to the traffic lane 51 in which the vehicle 10 is traveling, on the traffic lane 51 within the nearest driving zone of the navigation route. The stop avoidance area-setting device 26 also sets a stop avoidance area 90 based on the adjacent end location 62 where the traffic lane 63 ceases to be adjacent to the traffic lane 51 in which the vehicle 10 is traveling, on the traffic lane 51 within the nearest driving zone of the navigation route (step S104). Processing by the stop avoidance area-setting device 26 in step S104 will be described below with reference to FIG. 4.

Next, the avoidance area assessment device 27 of the vehicle control system 1 determines whether or not the stopping location 70 is within the stop avoidance areas 80, 90 (step S105). When the stopping location 70 is included between the first location 61a and second location 61b of the stop avoidance area 80, the avoidance area assessment device 27 determines that the stopping location 70 is within the stop avoidance area 80. When the stopping location 70 is included between the third location 62a and fourth location 62b of the stop avoidance area 90, the avoidance area assessment device 27 determines that the stopping location 70 is within the stop avoidance area 90.

In the example shown in FIG. 7, the stopping location 70 is included between the first location 61a and second location 61b of the stop avoidance area 80, and therefore the avoidance area assessment device 27 determines that the stopping location 70 is within the stop avoidance area 80 (step S105—Yes). Incidentally, when the stopping location 70 has an area with the approximate dimensions of the vehicle 10 and at least a portion of the stopping location 70 is included in the stop avoidance area 80, the avoidance area assessment device 27 determines that the stopping location 70 is within the stop avoidance area 80.

The vehicle stop planning device 28 of the vehicle control system 1 determines whether or not the vehicle 10 can be stopped at a location other than the stop avoidance areas 80, 90, between the adjacent start location 61 and the adjacent end location 62 (step S106).

In the example shown in FIG. 7, the vehicle stop planning device 28 determines that the vehicle 10 can be stopped at a location within the allowable stopping area 71 other than the stop avoidance areas 80, 90, between the adjacent start location 61 and the adjacent end location 62 (step S106—Yes). Processing by the vehicle stop planning device 28 in step S106 will be described below with reference to FIG. 5.

Next, the vehicle stop planning device 28 changes the stopping location to a location 72 within the allowable stopping area 71 other than the stop avoidance areas 80, 90, between the adjacent start location 61 and the adjacent end location 62 (step S107).

The vehicle stop planning device 28 then generates a stopping plan for stopping of the vehicle 10 at the changed stopping location 72 within the allowable stopping area 71, based on the current location of the vehicle 10, the speed of the vehicle 10, the navigation route and the map information (step S107). The vehicle stop planning device 28 carries out stopping plan processing whereby it generates a stopping plan representing the scheduled traveling trajectory of the vehicle 10 up until stopping of the vehicle 10. The stopping plan is represented as a combination of the target location of the vehicle 10 and the target vehicle speed at the target location, at each time from the current time until the predetermined time. The vehicle stop planning device 28 notifies the drive planning device 21 of the stopping plan. The drive planning device 21 generates a driving plan based on the notified stopping plan, and notifies the vehicle control device 22 of the driving plan. Also, as shown in FIG. 7, the vehicle control device 22 causes the vehicle 10 to travel based on the driving plan and stops it at the stopping location 72 on the traffic lane 51 at time T102.

On the other hand, when the vehicle 10 cannot be stopped at a location other than the stop avoidance areas 80, 90 between the adjacent start location 61 and adjacent end location 62 (step S106—No), the shoulder selection device 29 of the vehicle control system 1 selects a location on the shoulder 53 where the vehicle 10 can be stopped adjacent to the traffic lane 51, after the vehicle 10 has passed the adjacent end location 62, and changes the stopping location of the vehicle 10 to the selected location (step S108).

Figure 8:
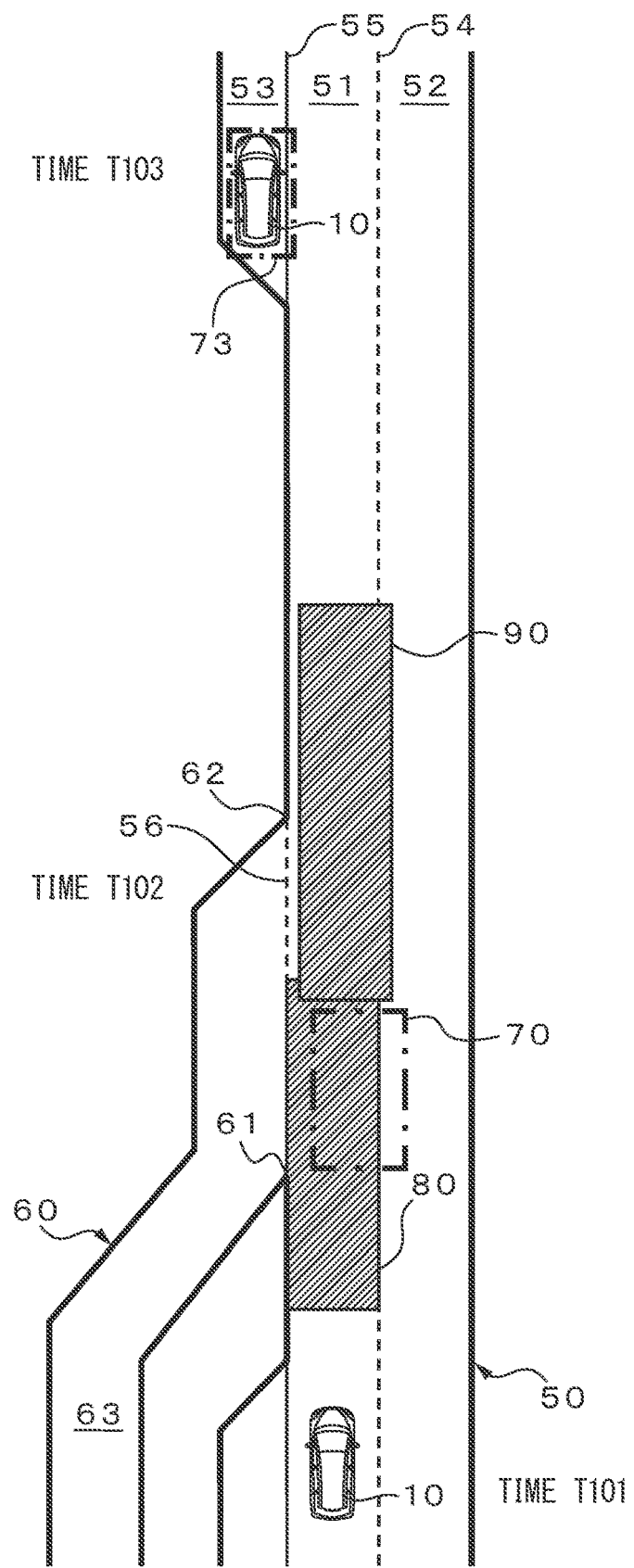
FIG. 8 is a diagram illustrating operation of a vehicle control system (3).

In the example shown in FIG. 8, the stop avoidance area 80 and stop avoidance area 90 overlap between the adjacent start location 61 and adjacent end location 62, and there is no location where the vehicle 10 can be stopped. The shoulder selection device 29 therefore refers to the map information and navigation route, selects a location on the shoulder 53 where the vehicle 10 can be stopped adjacent to the traffic lane 51, after the vehicle 10 has passed the adjacent end location 62, and changes the stopping location of the vehicle 10 to the selected location 73. The shoulder selection device 29 notifies the vehicle stop planning device 28 of the new stopping location 73.

The vehicle stop planning device 28 then generates a stopping plan for stopping of the vehicle 10 at the stopping location 73, based on the current location of the vehicle 10, the speed of the vehicle 10, the navigation route and the map information (step S108). The vehicle stop planning device 28 notifies the drive planning device 21 of the stopping plan. The drive planning device 21 generates a driving plan based on the notified stopping plan, and notifies the vehicle control device 22 of the driving plan. Also, as shown in FIG. 8, the vehicle control device 22 causes the vehicle 10 to travel based on the driving plan and stops it at the stopping location 73 on the shoulder 53 at time T103.

Figure 9:
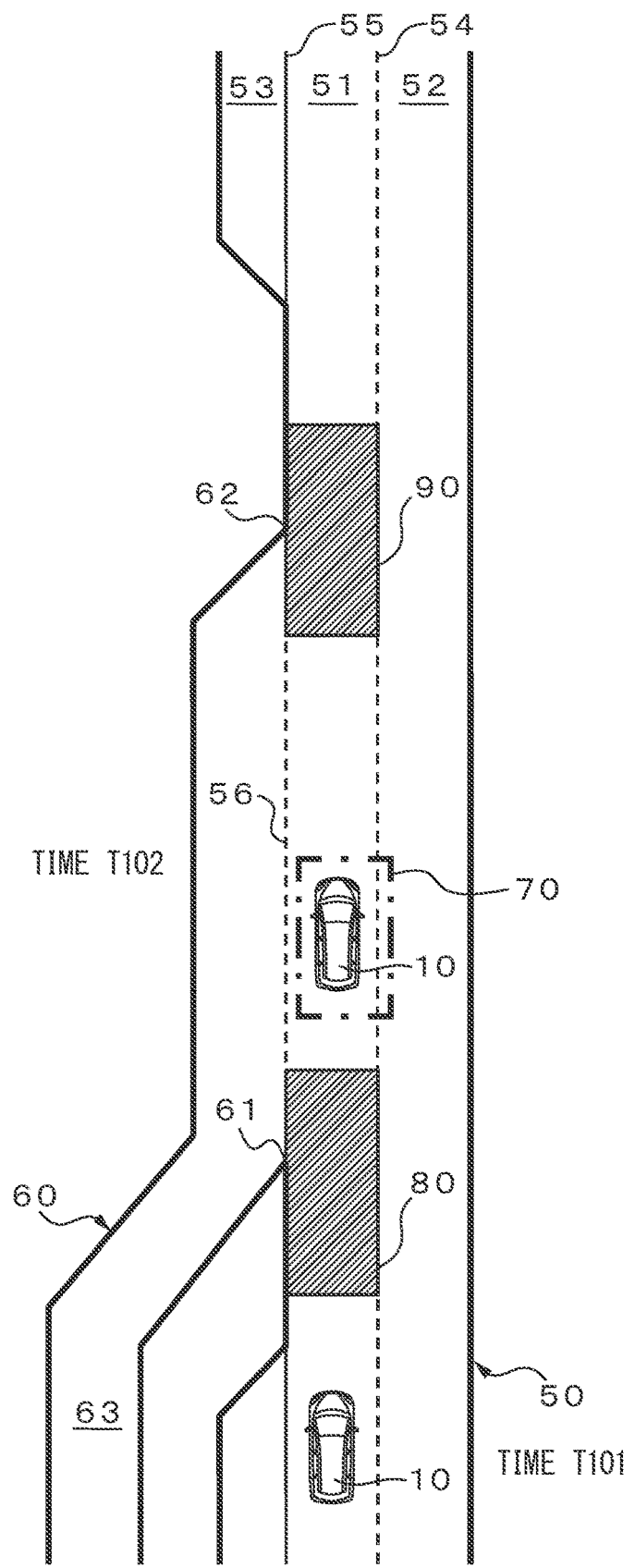
FIG. 9 is a diagram illustrating operation of a vehicle control system (4).

On the other hand, when it has been determined that the stopping location 70 is not included in the stop avoidance areas 80, 90 (step S105—No), the vehicle stop planning device 28 generates a stopping plan for stopping of the vehicle 10 at the stopping location 70 within the allowable stopping area 71, based on the current location of the vehicle 10, the speed of the vehicle 10, the navigation route and the map information (step S107). The vehicle stop planning device 28 notifies the drive planning device 21 of the stopping plan. The drive planning device 21 generates a driving plan based on the notified stopping plan, and notifies the vehicle control device 22 of the driving plan. Also, as shown in FIG. 9, the vehicle control device 22 causes the vehicle 10 to travel based on the driving plan and stops the vehicle 10 at the stopping location 70 on the traffic lane 51 at time T102.

Figure 10:
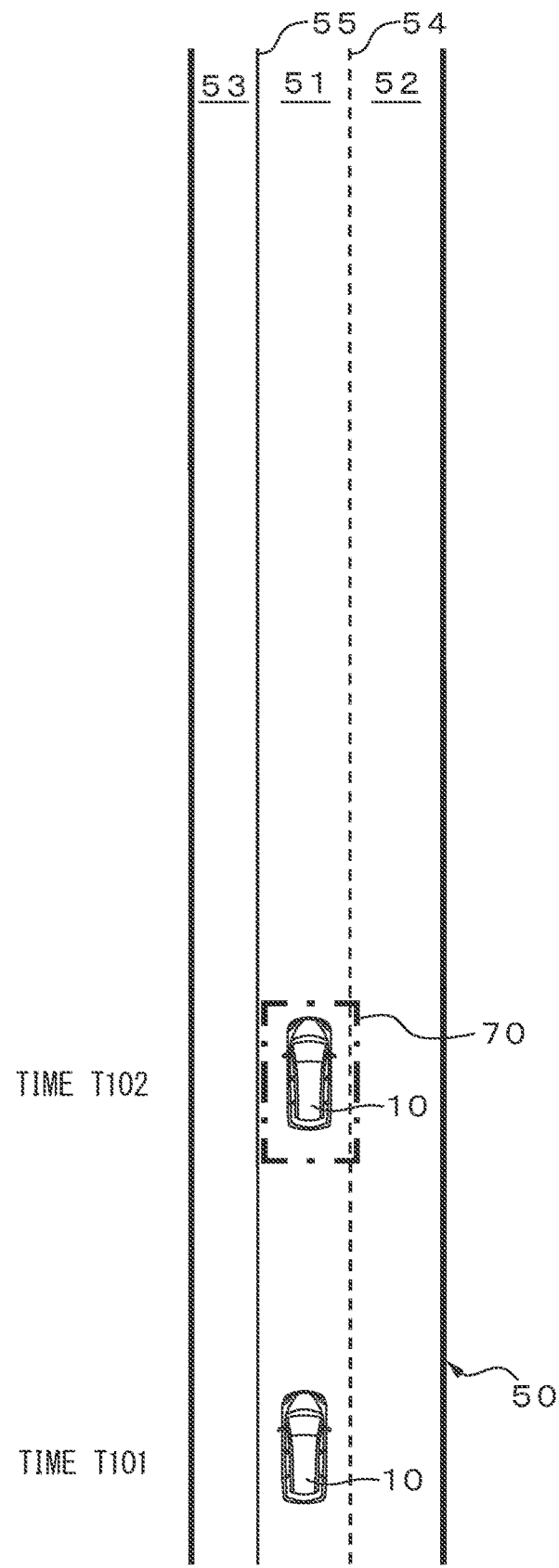
FIG. 10 is a diagram illustrating operation of a vehicle control system (5).

When another traffic lane is not adjacent to the stopping location 70 on the side opposite from the passing lane 52 (step S103—No), the vehicle stop planning device 28 generates a stopping plan for stopping of the vehicle 10 at the stopping location 70 based on the current location of the vehicle 10, the speed of the vehicle 10, the navigation route and the map information (step S107). The vehicle stop planning device 28 notifies the drive planning device 21 of the stopping plan. The drive planning device 21 generates a driving plan based on the notified stopping plan, and notifies the vehicle control device 22 of the driving plan. Also, as shown in FIG. 10, the vehicle control device 22 causes the vehicle 10 to travel based on the driving plan and stops the vehicle 10 at the stopping location 70 on the traffic lane 51 at time T102.

Figure 4:
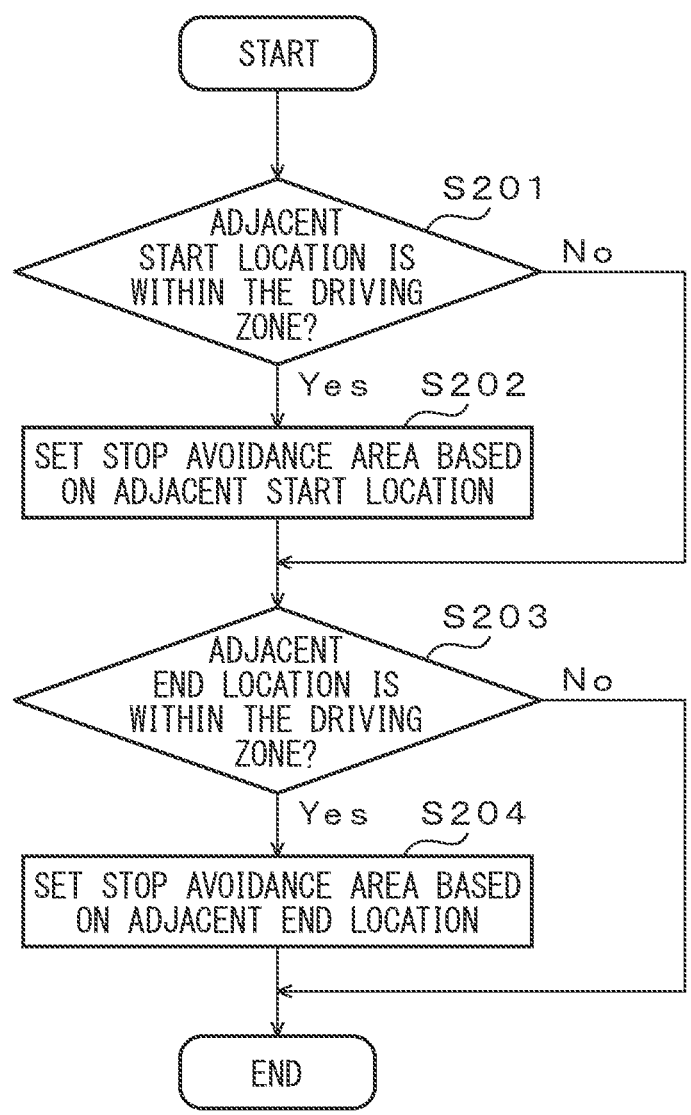
FIG. 4 is an operation flow chart for a stop avoidance area setting unit according to the embodiment.

FIG. 4 is an operation flow chart for a stop avoidance area-setting device 26 according to the embodiment. First, the stop avoidance area-setting device 26 refers to the current location of the vehicle, the navigation route and the map information and determines whether or not the adjacent start location where the another traffic lane begins to be adjacent to the traffic lane 51 in which the vehicle 10 is traveling is included within the nearest driving zone of the navigation route (step S201). In the example shown in FIG. 7, the adjacent start location 61 where the traffic lane 63 of the road 60 begins to be adjacent to the traffic lane 51 of the road 50 is included within the nearest driving zone of the navigation route, and therefore the stop avoidance area-setting device 26 determines that the adjacent start location is within the nearest driving zone of the navigation route (step S201—Yes).

The stop avoidance area-setting device 26 then sets a stop avoidance area 80 where stopping of the vehicle 10 is to be avoided, on the traffic lane 51 on which the vehicle 10 is traveling, based on the adjacent start location 61 (step S202).

The stop avoidance area-setting device 26 sets a stop avoidance area 80 to be an area of the traffic lane 51 between a first location 61a before the adjacent start location 61 and a second location 61b in the traveling direction of the vehicle 10 from the adjacent start location 61. The first location 61a may be a location before the adjacent start location 61 by a predetermined distance L1 (for example, 50 m). The second location 61b may be a location in the traveling direction from the adjacent start location 61 by a predetermined distance L2 (for example, 100 m). The first distance L1 and second distance L2 may also be determined based on the most recent average speed of the vehicle 10. For example, distance L1 and distance L2 may be determined so that distance L1 and distance L2 are longer with a faster average speed. Since the stop avoidance area 80 is situated across an area between the first location 61a before the adjacent start location 61 and the second location 61b in the traveling direction, then other vehicles entering into the road 50 on which the vehicle 10 is traveling from the road 60 will be able to move from the traffic lane 63 of the road 60 to the vehicle avoidance area 80 of the traffic lane 51 of the road 50, near the adjacent start location 61.

Next, the stop avoidance area-setting device 26 refers to the current location of the vehicle, the navigation route and the map information and determines whether or not the adjacent end location where the other traffic lane ceases to be adjacent to the traffic lane 51 in which the vehicle 10 is traveling, is within the nearest driving zone of the navigation route (step S203). In the example shown in FIG. 7, the adjacent end location 62, where the traffic lane 63 of the road 60 that merges with the road 50 ceases to be adjacent to the traffic lane 51 of the road 50, is included within the nearest driving zone of the navigation route, and therefore the stop avoidance area-setting device 26 determines that the adjacent end location is within the nearest driving zone of the navigation route (step S203—Yes).

The stop avoidance area-setting device 26 then sets a stop avoidance area 90 where stopping of the vehicle 10 is to be avoided, on the traffic lane 51 on which the vehicle 10 is traveling, based on the adjacent end location 62 (step S204). The stop avoidance area-setting device 26 sets a stop avoidance area 90 to be an area of the traffic lane 51 between a third location 62a before the adjacent end location 62 and a fourth location 62b in the traveling direction of the vehicle 10 from the adjacent end location 62. The third location 62a may be a location before the adjacent end location 62 by a predetermined distance L3 (for example, 100 m). The fourth location 62b may be a location in the traveling direction from the adjacent end location 62 by a predetermined distance L4 (for example, 150 m). The distance L3 and distance L4 may also be determined based on the most recent average speed of the vehicle 10. For example, distance L3 and distance L4 may be determined so that distance L3 and distance L4 are longer with a faster average speed. Since the stop avoidance area 90 is situated across an area between the third location 62a before the adjacent end location 62 and the fourth location 62b in the traveling direction, then other vehicles entering into the road 50 on which the vehicle 10 is traveling from the road 60 will be able to move from the traffic lane 63 of the road 60 to the stop avoidance area 90 of the traffic lane 51 of the road 50, near the adjacent end location 62. Processing then proceeds up to step S105.

When the adjacent start location is not within the nearest driving zone of the navigation route (step S201—No), processing proceeds up to step S203. When the adjacent end location is not within the nearest driving zone of the navigation route (step S203—No), processing proceeds up to step S105. This concludes explanation of processing by the stop avoidance area-setting device 26 in step S104.

Figure 5:
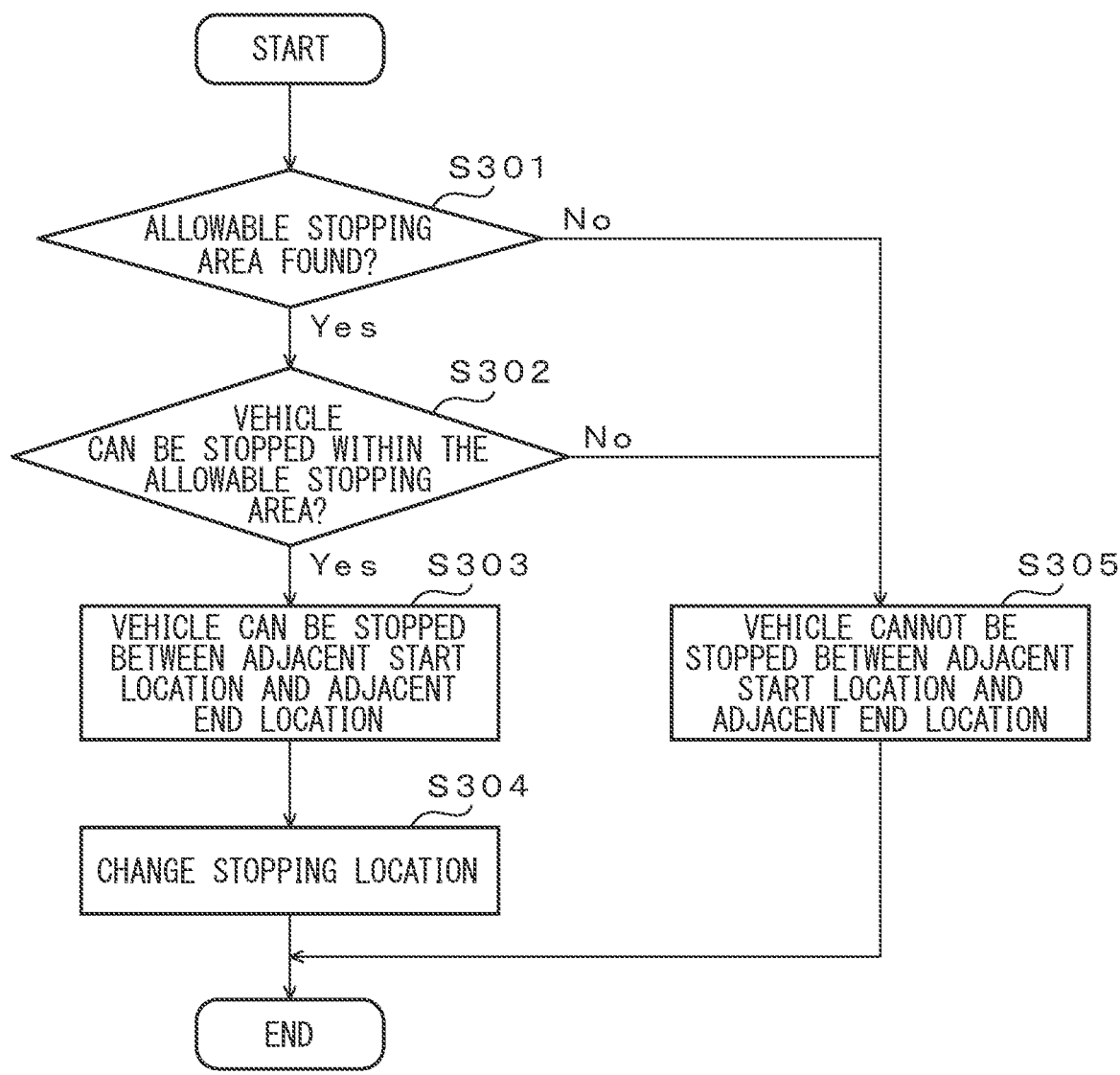
FIG. 5 is an operation flow chart for a vehicle control system of the embodiment.

FIG. 5 is an operation flow chart for a vehicle stop planning device 28 according to the embodiment. First, the vehicle stop planning device 28 determines whether or not there is an allowable stopping area in which the vehicle 10 can be stopped, in a range other than the stop avoidance areas 80, 90, between the adjacent start location 61 and the adjacent end location 62 (step S301). When there is an area having a length of at least the dimensions of the vehicle 10, the vehicle stop planning device 28 determines that there is an allowable stopping area where the vehicle 10 can be stopped (step S301—Yes). The dimensions of the vehicle 10 are stored in a memory of the vehicle stop planning device 28, for example.

When there is an allowable stopping area in which stopping is possible, the vehicle stop planning device 28 determines whether or not the vehicle 10 can be stopped within the allowable stopping area using the speed of the vehicle 10 and a deceleration below the target deceleration (step S302). When the vehicle 10 can be stopped within the allowable stopping area using the speed of the vehicle 10 and a deceleration below the target deceleration (step S302—Yes), the vehicle stop planning device 28 determines that the vehicle 10 can be stopped at a location other than the stop avoidance areas 80, 90 between the adjacent start location 61 and adjacent end location 62 (step S303). The vehicle stop planning device 28 changes the stopping location to be the location where the vehicle 10 stops within the allowable stopping area (step S304).

On the other hand, when there is no allowable stopping area in a region other than the stop avoidance areas 80, 90 between the adjacent start location 61 and adjacent end location 62 (step S301—No), or the vehicle 10 cannot be stopped within the allowable stopping area 71 using the speed of the vehicle 10 and deceleration below the target deceleration (step S302—No), the vehicle stop planning device 28 determines that the vehicle 10 cannot be stopped at a location other than the stop avoidance areas 80, 90 between the adjacent start location 61 and adjacent end location 62 (step S305). When the vehicle 10 cannot be stopped within the allowable stopping area using a deceleration below the target deceleration, the vehicle 10 cannot be stopped within the allowable stopping area without using a deceleration that does not cause anxiety for the driver, and therefore it is determined that the vehicle 10 cannot be stopped. This concludes explanation of processing by the vehicle stop planning device 28 in step S106.

As explained above, the vehicle control device determines whether or not a problem exists with the level of active operation by the driver, and when it has been determined that there is a problem with the driver, it sets a stopping location for stopping of the vehicle 10 on the traveling lane in which the vehicle 10 is traveling, based on the current location of the vehicle 10, the speed of the vehicle 10 and the map information. The vehicle control device determines whether or not another traffic lane is adjacent to the stopping location on the side opposite a passing lane, based on map information, and when it has been determined that another traffic lane is adjacent, it determines whether or not a stopping location is included within the stop avoidance area set on the traveling lane based on the adjacent start location where the other traffic lane begins to be adjacent to the traveling lane, or the adjacent end location where the other traffic lane ceases to be adjacent to the traveling lane. When it has been determined that the stopping location is within the stop avoidance area, the vehicle control device generates a stopping plan for stopping of the vehicle 10 at a location between the adjacent start location and the adjacent end location other than in the stop avoidance area. When a problem with the driver has occurred, the vehicle control device can thus stop the vehicle on a traveling lane adjacent to the other traffic lane, so as not to interfere with movement of other vehicles between the traveling lane and the other traffic lane.

Another operating example of the vehicle control device described above will now be described with reference to FIG. 11 and FIG. 12.

Figure 11:
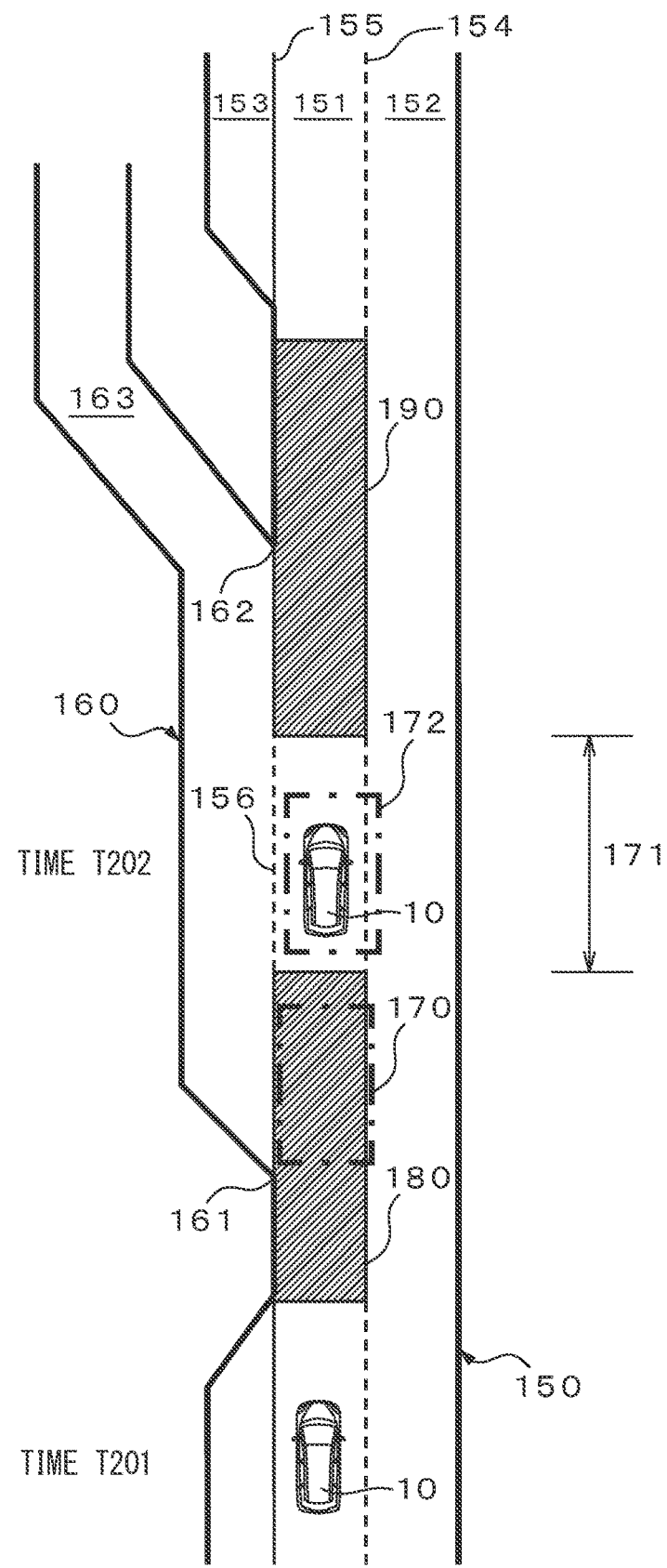
FIG. 11 is a diagram illustrating operation of a vehicle control system (6).

In the operating example shown in FIG. 11, a vehicle 10 travels on a traffic lane 151 of a road 150 having two traffic lanes 151, 152 and a shoulder 153. The traffic lane 152 is a passing lane with respect to the traffic lane 151. The traffic lanes 151 and 152 are divided by a lane marking line 154, and the traffic lane 151 and shoulder 153 are divided by a lane marking line 155.

A road 160 with a traffic lane 163 branches from the road 150. The road 160 and road 150 are connected between an adjacent start location 161 where the traffic lane 163 of the road 160 begins to be adjacent to the traffic lane 51 of the road 150, and an adjacent end location 162 where it ceases to be adjacent. The traffic lane 163 of the road 160 and the traffic lane 151 of the road 150 are divided by a lane marking line 156.

At time T201, the vehicle control system 1 determines that there is a problem with the level of active operation by the driver. The vehicle control system 1 sets a stopping location 170 for stopping of the vehicle 10 within the nearest driving zone of the navigation route, on the traffic lane 151 in which the vehicle 10 is traveling.

In the example shown in FIG. 11, the traffic lane 163 of the road 160 is adjacent on the opposite side from the passing lane 152 with respect to the stopping location 170, and therefore the vehicle control system 1 sets a stop avoidance area 180 based on the adjacent start location 161 where the traffic lane 163 of the road 160 begins to be adjacent to the traffic lane 151 in which the vehicle 10 is traveling, on the traffic lane 151 within the nearest driving zone of the navigation route. The vehicle control system 1 also sets a stop avoidance area 190 based on the adjacent end location 162 where the traffic lane 163 ceases to be adjacent to the traffic lane 151 in which the vehicle 10 is traveling, on the traffic lane 151 within the nearest driving zone of the navigation route.

In the example shown in FIG. 11, the stopping location 170 is within the stop avoidance area 180, and therefore the vehicle control system 1 generates a stopping plan for stopping of the vehicle 10 in the area 171 between the adjacent start location 161 and the adjacent end location 162, which excludes the stop avoidance area 180 and stop avoidance area 190. As a result, the vehicle 10 stops in the stopping location 172 within the allowable stopping area 171 of the traffic lane 151 at time T202. Incidentally, when the stop avoidance area 190 includes the stopping location 170, the vehicle control system 1 generates a stopping plan for stopping of the vehicle 10 at a location within the allowable stopping area 171 between the adjacent start location 161 and the adjacent end location 162, which excludes the stop avoidance area 180 and stop avoidance area 190. The vehicle 10 stops at the stopping location 172 in the traffic lane 151 based on the stopping plan, at time T202.

Stopping of the vehicle 10 at the stopping location 172 within the area 171 allows other vehicles, that exit from the road 150 on which the vehicle 10 is traveling onto the road 160, to move from the stop avoidance area 180 of the traffic lane 151 of the road 150 to the traffic lane 163 of the road 160, near the adjacent start location 161. Other vehicles can also move from the stop avoidance area 190 of the traffic lane 151 of the road 150 to the traffic lane 163 of the road 160, near the adjacent end location 162.

Figure 12:
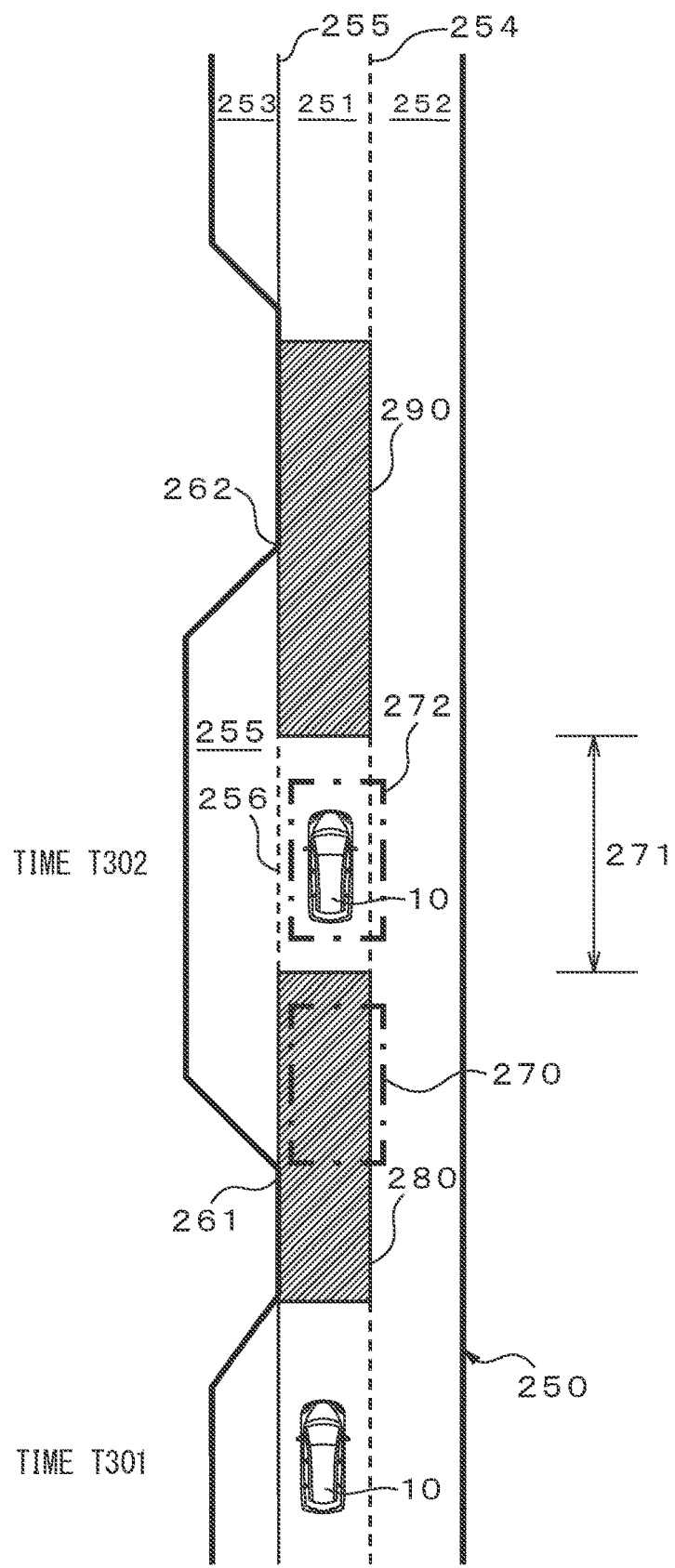
FIG. 12 is a diagram illustrating operation of a vehicle control system (7).

In the operating example shown in FIG. 12, a vehicle 10 travels on a traffic lane 251 of a road 250 having two traffic lanes 251, 252 and a shoulder 253. The traffic lane 252 is a passing lane with respect to the traffic lane 251. The traffic lanes 251 and 252 are divided by a lane marking line 254, and the traffic lane 251 and shoulder 253 are divided by a lane marking line 255.

The road 250 has a traffic lane 255 that is partially adjacent to the traffic lane 251. The traffic lane 255 and traffic lane 251 are connected between an adjacent start location 261 where the traffic lane 255 begins to be adjacent to the traffic lane 251, and an adjacent end location 262 where it ceases to be adjacent. The traffic lane 255 and the traffic lane 251 of the road 150 are divided by a lane marking line 256.

At time T301, a problem with the driver is determined by the vehicle control system 1. The vehicle control system 1 sets a stopping location 370 for stopping of the vehicle 10 within the nearest driving zone of the navigation route, on the traffic lane 251 in which the vehicle 10 is traveling.

In the example shown in FIG. 12, the traffic lane 255 is adjacent to the stopping location 270 on the opposite side from the passing lane 252, and therefore the vehicle control system 1 sets a stop avoidance area 280 based on the adjacent start location 261 where the traffic lane 255 begins to be adjacent to the traffic lane 251 in which the vehicle 10 is traveling, on the traffic lane 251 within the nearest driving zone of the navigation route. The vehicle control system 1 also sets a stop avoidance area 290 based on the adjacent end location 262 where the traffic lane 255 ceases to be adjacent to the traffic lane 251 in which the vehicle 10 is traveling, on the traffic lane 251 within the nearest driving zone of the navigation route.

In the example shown in FIG. 12, the stopping location 270 is within the stop avoidance area 280, and therefore the vehicle control system 1 generates a stopping plan for stopping of the vehicle 10 at a location in the area 271 between the adjacent start location 261 and the adjacent end location 262, which excludes the stop avoidance area 280 and stop avoidance area 290. As a result, the vehicle 10 stops in the allowable stopping area 271 of the traffic lane 251 at time T302. Incidentally, when the stopping location 270 is within the stop avoidance area 290, the vehicle control system 1 generates a stopping plan for stopping of the vehicle 10 at a location within the allowable stopping area 271 between the adjacent start location 261 and the adjacent end location 262, which excludes the stop avoidance area 280 and stop avoidance area 290. The vehicle 10 stops at the stopping location 272 in the traffic lane 251 based on the stopping plan, at time T302.

Stopping of the vehicle 10 at the stopping location 272 within the allowable stopping area 271 allows other vehicles, that are to move from the traffic lane 251 in which the vehicle 10 is traveling to the traffic lane 255, to move from the traffic lane 251 to the stop avoidance area 280 of the traffic lane 255, near the adjacent start location 261. Similarly, other vehicles can move from the traffic lane 255 into the stop avoidance area 290 of the traffic lane 251, near the adjacent end location 262.

As mentioned above, when an problem has occurred in the level of active operation by the driver, the vehicle control system 1 can stop the vehicle 10 on the traffic lane 251 adjacent to the traffic lane 255, so as not to interfere with movement of other vehicles that are to move from the traffic lane 251 in which the vehicle 10 is traveling to the traffic lane 255, between the traffic lane 251 in which the vehicle 10 is traveling and the traffic lane 255.

The vehicle control device, the medium that stores a computer program for vehicle control and the method for controlling a vehicle according to the embodiment described above may incorporate appropriate modifications that are still within the gist of this disclosure. Moreover, the technical scope of the invention is not limited to this embodiment, and includes the invention and its equivalents as laid out in the Claims.

For example, when it has been determined that there is a problem with the driver, the embodiment described above set the stopping location on the traveling lane based on a target deceleration, but it may instead set the stopping location using a deceleration that is greater than the target deceleration, in the following situations. (1) When the brake pedal (not shown) has been operated, (2) when the accessory switch has been operated, (3) when the shift position has been changed to the neutral position, (4) when the current location of the vehicle has approached the border of a region represented by high precision map information stored in the map information storage device, (5) when the current location of the vehicle has approached a merging location between the road on which the vehicle is traveling and another road, (6) when an obstacle in front of the vehicle has been detected, (7) when an abnormality has been detected in a device that detects other objects, such as a radar sensor or camera, (8) when the vehicle has continuously traveled for a predetermined distance or the vehicle has continuously traveled for a predetermined period of time, (9) when the location of the vehicle has deviated by a predetermined distance from the location on the scheduled traveling trajectory of the driving plan, or (10) when a problem has been detected in the location estimating device, and higher deceleration than the target deceleration can be used to stop the vehicle on the traveling lane.

The invention claimed is:

1. A vehicle control device comprising:
a processor that is configured to execute computer readable program instructions stored in a memory; the stored computer readable program instructions causing the processor to:
determine whether or not a problem exists with the level of active operation by the driver,
set a stopping location for stopping of the vehicle on a traveling lane in which the vehicle is traveling based on at least map information, when it has been determined that there is a problem with the driver,
determine whether or not another traffic lane is adjacent to the stopping location on the side opposite a passing lane, based on the map information,
determine whether or not the stopping location is within a stop avoidance area set on the traveling lane based on an adjacent start location where the other traffic lane begins to be adjacent to the traveling lane or an adjacent end location where the other traffic lane ceases to be adjacent to the traveling lane when it has been determined that another traffic lane is adjacent,
generate a stopping plan for stopping of the vehicle at a location between the adjacent start location and the adjacent end location other than in the stop avoidance area when it has been determined that the stopping location is within the stop avoidance area; and
stop the vehicle at the location.

2. The vehicle control device according to claim 1 wherein:
the processor is further configured to select a location on the shoulder where the vehicle can be stopped adjacent to the traveling lane after the vehicle has passed the adjacent end location when it has been determined that the vehicle cannot be stopped between the adjacent start location and the adjacent end location, and
the processor is further configured to generate a stopping plan for stopping of the vehicle at the selected location on the shoulder.

3. The vehicle control device according to claim 1, wherein the processor is further configured either to set the stop avoidance area as an area of the traveling lane between a first location before the adjacent start location and a second location in the vehicle traveling direction from the adjacent start location, or to set the stop avoidance area as an area of the traveling lane between a third location before the adjacent end location and a fourth location in the vehicle traveling direction from the adjacent end location.

4. A computer-readable, non-transitory medium storing computer readable program instructions for vehicle control, wherein the computer readable program instructions are executable by a processor to cause the processor to:
determine whether or not a problem exists with the level of active operation by the driver;
set a stopping location for stopping of the vehicle on a traveling lane in which the vehicle is traveling based on at least map information, when it has been determined that there is a problem with the driver;
determine whether or not another traffic lane is adjacent to the stopping location on the side opposite a passing lane, based on the map information;
determine whether or not the stopping location is within a stop avoidance area set on the traveling lane based on an adjacent start location where the other traffic lane begins to be adjacent to the traveling lane or an adjacent end location where the other traffic lane ceases to be adjacent to the traveling lane when it has been determined that another traffic lane is adjacent;
generate a stopping plan for stopping of the vehicle at a location between the adjacent start location and the adjacent end location other than in the stop avoidance area when it has been determined that the stopping location is within the stop avoidance area; and
stop the vehicle at the location.

5. A method for controlling a vehicle carried out by a vehicle control device, the method comprising:
determining whether or not a problem exists with the level of active operation by the driver;
setting a stopping location for stopping of the vehicle on a traveling lane in which the vehicle is traveling based on at least map information, when it has been determined that there is a problem with the driver;
determining whether or not another traffic lane is adjacent to the stopping location on the side opposite a passing lane, based on the map information;
determining whether or not the stopping location is within a stop avoidance area set on the traveling lane based on an adjacent start location where the other traffic lane begins to be adjacent to the traveling lane or an adjacent end location where the other traffic lane ceases to be adjacent to the traveling lane when it has been determined that another traffic lane is adjacent; and generating a stopping plan for stopping of the vehicle at a location between the adjacent start location and the adjacent end location other than in the stop avoidance area when it has been determined that the stopping location is within the stop avoidance area; and stopping the vehicle at the location.

\* \* \* \* \*